2,830,056

SUBSTITUTED PHENYLPIPERAZINES AND PROCESS OF PREPARING THEM

Heinrich Ruschig, Bad Soden (Taunus), Dieter Schmidt-Barbo, Hofheim (Taunus), and Heinrich Leditschke, Manfred Schorr, and Georg Lammler, Frankfurt am Main, Germany, assignors to Farbwerke Hoechst Aktiengesellschaft vormals Meister Lucius & Bruning, Frankfurt am Main, Germany, a corporation of Germany No Drawing. Application July 18, 1955
Serial No. 522,858

Claims priority, application Germany July 19, 1954

9 Claims. (Cl. 260—268)

This invention relates to substituted phenylpiperazines of the general formula

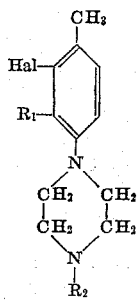

wherein Hal represents a halogen atom, $R_1$ a hydrogen atom or a methyl group and $R_2$ represents a hydrogen atom, a low molecular alkyl, alkenyl, hydroxyalkyl or aralkyl group, as well as the salts thereof, and to a process of preparing them by introduction of a piperazine radical into para-position to the methyl group of toluenes containing further nuclear substituents. The invention relates particularly to compounds of the above formula, wherein $R_1$ represents a hydrogen atom and $R_2$ likewise a hydrogen atom or a low molecular alkyl group.

It is known that piperazine derivatives, for instance the 1-diethyl-carbamido-4-methyl-piperazine, has gained special importance for the control of filariae.

The piperazine radical is introduced by reacting para-toluidines containing nuclear substituents with diethanol amine or diethanolamines whose amino group is substituted by low molecular alkyl, alkenyl, hydroxyalkyl or aralkyl groups, or the reactive esters thereof or by reacting paratoluidine, containing nuclear substituents with ethylene oxide or ethylene halogen hydrins converting the primary alcohol groups of the condensation products into reactive ester groups, and reacting the esters with primary amines, or by reacting 3-nitro-4-halogen-toluenes containing nuclear substituents with piperazine or with N-mono-alkyl-piperazines, reducing the nitro group to the amino group, transforming the latter into the diazonium group, replacing it in usual manner by hydrogen and alkylating the piperazines obtained, if desired.

The substituted toluenes used as starting materials may contain one or several substituents of the same or of a different type, for instance halogen atoms, amino, nitro or alkyl groups. Para-toluidines substituted in the nucleus by chlorine are preferably used. There may be mentioned for instance: 2-chloro-4-amino-toluene, 2-bromo-4-amino-toluene, 2-iodo-4-amino-toluene, 2-fluoro-4-amino-toluene, 2-chloro-3-methyl-4-amino-toluene, 2-bromo-3-methyl-4-amino-toluene and 3-nitro-4:6-dichloro-toluene.

The conversion of the substituted para-toluidines into the corresponding piperazines can be carried out in the following manner:

Reactive esters of the diethanol amine or of diethanol amines whose amino group is substituted by hydrocarbon radicals are reacted with para-toluidines substituted in the nucleus. The reaction is advantageously carried out in the presence of acid-binding agents, preferably sodium carbonate, and with the use of organic solvents. As organic solvents there come for instance into consideration lower aliphatic alcohols, preferably methanol and ethanol. As reactive esters there may advantageously be used esters of halogen hydracids, sulphuric acid or para-toluene-sulphonic acid. The reaction is carried out at moderately elevated temperatures, preferably at the boiling temperature of the solvent used. As diethanol amines being substituted in the amino group there are preferably used N-alkylated compounds but alkenyl, hydroxyalkyl or aralkyl diethanol amines may also be used.

For the reaction with the para-toluidines it is not necessary to apply the reactive esters in substance. There may also be used mixtures of the diethanol amines with phosphorus chlorides, thionyl chloride, aluminum chloride, para-toluene sulphonic acid and preferably mineral acids, especially halogen hydracids. Such mixtures are heated with the substituted para-toluidines, advantageously to a temperature between about 180° C. and 250° C., and the piperazines are thus obtained in a good yield.

Another method of the process according to the invention involves the reaction of the substituted para-toluidines with ethylene halogen hydrins resulting in the formation of the corresponding N:N-di-($\beta$-hydroxyethyl)-toluidines. This reaction is carried out at elevated temperatures, preferably at a temperature betwen 100° C. and 120° C. The halogen hydracids formed are bound by basic compounds, for instance quicklime. Instead of ethylene halogen hydrins there may also be used ethylene oxide. The reaction is advantageously carried out in the presence of organic solvents and in closed vessels at elevated temperatures, preferably between 130° C. and 160° C. As organic solvents may be used aromatic hydrocarbons such as benzene, toluene and xylene. Benzene, however, is most suitable.

The primary alcohol groups contained in the condensation products of para-toluidines substituted in the nucleus and of ethylene halogen hydrins or ethylene oxide are transformed in the usual manner into reactive ester groups. As reactive esters are used those with sulphuric acid or halogen hydracids, which can be prepared, for example, by means of phosphorus chlorides or phosphorus oxychloride. The ring closure to piperazine is effected by the action of primary amines. This reaction can advantageously be carried out in the presence of condensing agents, for instance alkali metal carbonate or tertiary amines. It is advantageous to operate in the presence of organic solvents such as inferior aliphatic alcohols.

The amines used for the ring closure are preferably of aliphatic character. There may, for instance, be used: methyl amine, ethyl amine, propyl amine, allyl amine, butyl amine and ethanol amine; however, benzyl amine may also be used successfully. If the ring closure to piperazine is effected by means of ammonia, the reaction products may be alkylated, if desired.

The reaction of the 3-nitro-dihalogen-toluenes containing nuclear substituents with piperazine or N-monoalkyl-piperazines may be carried out in the presence or absence of solvents. Among the aromatic hydrocarbons preferably used as solvents there may be mentioned benzene, toluene or xylene; toluene, however, is preferred.

The mentioned reaction is advantageously carried out at moderately elevated temperatures, advantageously at the boiling temperature of the solvent used. It is useful to add acid-binding agents. As such agents may be used, for instance, sodium carbonate or tertiary organic bases but there may also be used an excess of piperazine.

In the condensation products formed, the reduction of the nitro group to the amino group can be carried out in known manner, for instance with tin or iron in the presence of hydrochloric acid or with hydrogen in the presence of nickel. The amino group is diazotised as usual. The diazonium group formed can be replaced in known manner by a hydrogen atom.

According to the invention it is possible to alkylate the piperazine derivatives obtained by condensation of the 3-nitro-4-halogen-toluenes containing nuclear substituents with piperazine. However, it is also possible to effect the alkylation only after the nitro group has been reduced, diazotised and further converted.

The compounds obtained according to the process of the present invention can be transformed into water-soluble salts by means of inorganic and organic acids. As inorganic acids may be mentioned: halogen hydracids such as hydrochloric acid, and hydrobromic acid, phosphoric acid, sulphuric acid, amido-sulphonic acid. As organic acids may be mentioned: acetic acid, propionic acid, lactic acid, malonic acid, succinic acid, malic acid, tartaric acid, maleic acid, aceturic acid, hydroxy-ethane-sulphonic acid, citric acid, benzoic acid, salicylic acid.

The compounds obtained according to the process of the present invention are valuable medicaments. As such and especially in the form of their salts they are suitable as chemotherapeutics with specific action against infections caused by schistosomes. In the case of experimental schistosoma mansoni infection a single dose of 25 milligrams of the 1-(3-chloro-4-methyl-phenyl)-piperazine maleate per 1 kg. of mouse given perorally leads to a sterilising healing process. As regards the chemotherapeutic range, the mentioned compound is far superior to the known compounds being effective against bilharziae, such as the 1-diethylamino-ethylamino-4-methyl-thioxanthone hydrochloride and the 2-chloro-4-diethylamino-ethylamino-toluene hydrochloride.

It is known to prepare the corresponding piperazines by reaction of chloranilines or toluidines with bis-(2-chlorethyl)-amine or diethanol amines or the hydrochlorides thereof (J. Am. Chem. Soc. 76 (1954), page 1853). These compounds are partly to be used as antihistamines; however, we have found that regarding their action on bilharzia infections they are markedly inferior to the compounds obtained according to the process of the present invention.

The following examples serve to illustrate the invention, but they are not intended to limit it thereto:

EXAMPLE 1

*1-methyl-4-(3'-chloro-4'-methyl-phenyl)-piperazine*

A mixture of 52 grams of 2-chloro-4-amino-toluene, 70 grams of methyl-di-(chlorethyl)-amine hydrochloride, 39 grams of anhydrous sodium carbonate and 250 cc. of methanol is heated for 16 hours under reflux, while stirring. The major part of the methanol is distilled off, water is added to the residue and the whole is made alkaline by means of an alkali metal hydroxide solution. The oil which separates is taken up with methylene chloride and, after drying and distilling off the methylene chloride, it is fractionated under reduced pressure. The 1-methyl - 4 - (3'-chloro-4'-methylphenyl)-piperazine distills over between 160° C. and 161° C. under a pressure of 2 mm. as a practically colourless liquid. The yield amounts to 16 grams.

The monohydrochloride is obtained from acetone in the form of small colourless, matted needles which melt at 260° C. with decomposition.

EXAMPLE 2

*1-(3'-chloro-4'-methyl-phenyl)-piperazine*

622 grams of 2-chloro-4-amino-toluene (4.4 mols), 420 grams of diethanol amine and 750 cc. of concentrated hydrochloric acid (of 37 percent strength) are filled into an open flask and are heated for 8 hours, while stirring repeatedly, in a metal bath at an external temperature of 220° C.–240° C. The dark contents of the flask is then dissolved in water and 360 grams of sodium hydroxide dissolved in 600 cc. of water are added. The oil is taken up in chloroform and dried over potassium carbonate. After evaporation of the chloroform there are obtained by distillation 273 grams of 1-(3'-chloro-4'-methylphenyl)-piperazine boiling at 212° C.–215° C. under a pressure of 34 mm. The maleate melts at 151° C.

EXAMPLE 3

*1-butyl-4-(3'-chloro-4'-methyl-phenyl)-piperazine*

622 grams of 2-chloro-4-amino-toluene, 516 grams of n-butyldihydroxyethyl-amine are heated for 7 hours with 750 cc. of concentrated hydrochloric acid (of 37 percent strength) in a metal bath at an external temperature of 200° C.–240° C. The contents of the flask is dissolved in water and a solution of sodium hydroxide in 600 cc. of water is added. The oil which has separated is taken up in chloroform and dried over potassium carbonate. After distillation there are obtained 213 grams of 1-butyl-4-(3'-chloro-4'-methyl-phenyl)-piperazine boiling at 179° C.–180° C. under a pressure of 1 mm. The maleate melts at 151° C.

EXAMPLE 4

*1-hydroxyethyl-4-(3'-chloro-4'-methyl-phenyl)-piperazine*

(a) A mixture of 423 grams (3 mols) of 2-chloro-4-amino-toluene, 600 grams of ethylene chlorhydrin and 180 grams of quicklime are heated while stirring for 20 hours at 110° C. Water is added to the reaction product and the oil that has separated is taken up in chloroform. After drying and distilling there are obtained 450 grams of 3-chloro - 4 - methyl - N:N-di($\beta$-hydroxyethyl)-aniline boiling at 194° C.–212° C. under a pressure of 4 mm.

(b) 360 grams of 3 - chloro - 4 - methyl-N:N-di-($\beta$-hydroxyethyl)-aniline are dissolved in 600 cc. of absolute chloroform and there are added, while cooling, 370 grams of phosphorus pentachloride. The whole is heated for 8 hours under reflux, the reaction mixture is poured into water, and the chloroform layer is first shaken with a sodium carbonate solution and then with water. There are obtained 270 grams of 3-chloro-4-methyl-N:N-di-($\beta$-chlorethyl)-aniline boiling at 182° C.–183° C. under a pressure of 4 mm.

(c) 133 grams of 3-chloro-4-methyl-N:N-di-($\beta$-chloroethyl)-aniline and 61 grams of aminoethanol are heated in 200 cc. of absolute ethanol for 4 hours at 150° C. The solvent is then evaporated, the residue is dissolved in dilute hydrochloric acid and, after addition of an alkali hydroxide solution, the oil that has separated is taken up in chloroform. After drying and distilling there are obtained 85 grams of 1 - hydroxyethyl - 4 - (3' - chloro-4'-methyl-phenyl)-piperazine boiling at 219° C. under a pressure of 5 mm.

EXAMPLE 5

*1-ethyl-4-(3'-chloro-4'-methyl-phenyl)-piperazine*

(a) 3 - chloro - 4-methyl-N:N-di-($\beta$-hydroxyethyl)-aniline: A mixture of 141 grams of 2-chloro-4-amino-toluene, 200 grams of ethylene chlorhydrin and 60 grams of finely powdered calcium oxide is heated for 20 hours at 110° C.

The mixture is stirred as long as possible. It becomes more and more viscous and finally it solidifies almost completely. After cooling, the reaction mass is introduced into water and the oil that separates is taken up with methylene chloride. After drying over sodium sulphate and distilling off the solvent, the product is distilled under reduced pressure. The 3-chloro-4-methyl-N:N-di-(β-hydroxyethyl)-aniline distills over between 205° C. and 212° C. under a pressure of 3.5 mm. as a reddish oil, which, on cooling, solidifies in the form of crystals. The yield amounts to 184 grams. The product can further be purified by recrystallisation from benzene and is obtained in the form of colourless needles melting at 79° C.

(b) 105 grams of 2-chloro-4-amino-toluene are dissolved in 300 cc. of benzene and, after addition of 90 cc. of ethylene oxide, heated for 9 hours at 150° C. in an autoclave. On rubbing the clear solution obtained, the 3-chloro-4-methyl-N:N-di-(β-hydroxyethyl)-aniline crystallises out. It is sucked off and dried on the air. The yield amounts to 121 grams and, by concentrating the mother liquor, it can be increased by another 10 grams. The product melts at 78° C.

(c) 3 - chloro-4-methyl-N:N-di-(β-chloroethyl)-aniline: 190 grams of 3-chloro-4-methyl-N:N-di-(β-hydroxyethyl)-aniline are dissolved in 300 cc. of chloroform. In this solution there are introducd in portions, while cooling, 185 grams of phosphorus pentachloride, a strong reaction occurring each time. Finally the whole is heated with reflux on the steam bath until no mor hydrogen chloride evolves. After cooling, the solution is poured into ice water, the chloroform layer is separated, washed well with water and dried over sodium sulphate. After distilling off the solvent, the 3-chloro-4-methyl-N:N-di-(β-chloroethyl)-aniline is distilled under reduced pressure. It distilld over between 181° C. and 184° C. under a pressure of 4 mm. as a yellowish oil, which turns green when exposed to the air. The yield amounts to 153 grams.

(d) A mixture of 400 cc. of benzene and 145 cc. of phosphorus oxychloride is poured over 130 grams of 3-chloro - 4 - methyl - N:N-di-(β-hydroxyethyl)-aniline. A vigorous reaction sets in at once. After its cessation the whole is heated under reflux on the steam bath until no more hydrogen chloride is evolved, is then cooled and poured into ice water. The benzene layer is washed with water, dried over sodium sulphate, and finally the benzene is distilld off. The 3-chloro-4-methyl-N:N-di-(β-chloroethyl)-aniline is distilled as described under (c). The yield amounts to 116 grams.

(e) 1-ethyl-4-(3'-chloro-4'-methyl-phenyl)-piperazine: 38 grams of 3-chloro-4-methyl-N:N-di-(β-chloroethyl)-aniline are dissolved in a solution of 6.5 grams of ethylamine in 250 cc. of ethanol. After addition of 15 grams of anhydrous sodium carbonate the whole is heated for 6 hours at 150° C. in a shaking autoclave. The alcohol is then distilled off to a great extent, a dilute alkali metal hydroxide solution is added to the residue and the oil that separates is taken up with methylene chloride. After drying this solution and distilling off the solvent, the solution is distilled under reduced pressure. Between 152° C. and 158° C. under a pressure of 2 mm. there passes over a still impure product, from which the pure monohydrochloride can be obtained from acetone. The monohydrochloride consists of a colourless crystalline powder which shows a neutral reaction when dissolved in water and which melts at 165° C. The yield amounts to 14 grams.

EXAMPLE 6

*1-allyl-4-(3'-chloro-4'-methyl-phenyl)-piperazine*

27 grams of 3-chloro-4-methyl-N:N-di-(β-chloroethyl)-aniline and 6 grams of allyl amine are dissolved in 200 cc. of ethanol and, after addition of 11 grams of anhydrous sodium carbonate, heated in an autoclave for 5 hours at 120° C. The alcohol is then distilled off to a great extent, water is added to the residue and the whole is made alkaline by means of a dilute alkali metal hydroxide solution. The oil which separates is taken up with methylene chloride, the solution is dried over sodium sulphate the methylene chloride is evaporated, and the residue is distilled under reduced pressure. The still impure product passes over between 160° C. and 165° C. under a pressure of 1.5 mm. After recrystallisation from acetone there are obtained 10 grams of the pure monohydrochloride, which melts at 178° C.–179° C.

EXAMPLE 7

*1-benzyl-4-(3'-chloro-4'-methyl-phenyl)-piperazine*

133 grams of 3-chloro-4-methyl-N:N-di-(β-chlorethyl)-aniline and a solution of 107 grams of benzylamine in 200 cc. of absolute ethanol are heated for 4 hours at 150° C. After evaporation of the solvent the residue is dissolved in dilute hydrochloric acid, is made alkaline and the base is taken up in chloroform. After drying over potassium carbonate and distilling, there are obtained 50 grams of 1-benzyl-4-(3'-chloro-4'-methyl-phenyl)-piperazine boiling at 227° C. under a pressure of 2 mm. After recrystallisation from alcohol there are obtained crystals melting at 75° C. The corresponding maleate melts at 162° C.

EXAMPLE 8

*1-ethyl-4-(3'-bromo-4'-methyl-phenyl)-piperazine*

(a) 3-bromo - 4 - methyl-N:N-di - (β - hydroxyethyl)-aniline: A solution of 170 grams of 2-bromo-4-aminotoluene and 120 cc. of ethylene oxide in 425 cc. of benzene is heated for 9 hours in an autoclave at 150° C. The crystalline compound is sucked off and dried on the air. The yield amounts to 200 grams and can be improved by concentrating the mother liquor. The colourless product melting at 87° C.–88° C. can be further purified by recrystallisation from benzene. After recrystallisation it melts at 89° C.

(b) 3-bromo-4-methyl-N:N-di-(β-chloroethyl)-aniline: A solution of 180 cc. of phosphorus oxychloride in 520 cc. of benzene is poured over 200 grams of 3-bromo-4-methyl-N:N-di-(β-hydroxyethyl)-aniline. After cessation of the first reaction the whole is heated under reflux on the steam bath until no more hydrogen chloride is evolved. After cooling, it is poured into ice water, the separated benzene layer is washed well with water, dried over sodium sulphate, and the benzene is distilled off. The residue is distilled under reduced pressure. The 3-bromo-4-methyl-N:N-di-(β-chlorethyl)-aniline distills over, between 181° C. and 182° C. under a pressure of 1.5 mm., as a yellow oil which turns dark on standing. The yield amounts to 177 grams.

(c) 1-ethyl-4-(3'-bromo-4'-methyl-phenyl)-piperazine: 21 grams of sodium carbonate are added to a solution of 8.7 grams of ethylamine and 60 grams of 3-bromo-4-methyl - N:N-di - (β - chlorethyl) - aniline in 300 cc. of ethanol. The mixture is heated for 5 hours in an autoclave at 120° C. The alcohol is then distilled off to a great extent, water is added to the residue and the whole is made alkaline by means of a dilute alkali metal hydroxide solution. The oil which separates is taken up in methylene chloride, the solution is dried, the solvent is evaporated and the residue is distilled off under reduced pressure. A still impure product distills over between 154° C.–170° C. under a pressure of 1.8 mm. The pure monohydrochloride is obtained by recrystallisation from acetone. It melts at 190° C. The yield amounts to 25 grams.

EXAMPLE 9

*1-(3'-chloro-4'-methyl-phenyl)-piperazine*

A mixture of 221 grams of 2-chloro-4-amino-toluene, 184 grams of diethanol-amine and 380 cc. of hydrobromic acid of 48 percent strength is heated to 190° C.–210° C. and maintained at this temperature for 7 hours. The coolmelt is dissolved in water, made alkaline and shaken out with ether or methylene chloride.

The residue remaining after drying and evaporation of the solvent is distilled under reduced pressure. 241 grams of a crude 1-(3'-chloro-4'-methyl-phenyl)-piperazine are obtained which have a boiling point of 136° C.–137° C. under a pressure of 0.5 mm. By dissolving in acetone and neutralising with ethanolic hydrochloric acid, there are obtained 240 grams of the monohydrochloride melting at 199° C.–201° C. After recrystallising once from ethanol the melting point amounts to 201° C.–202° C. The fumarate melts at 169° C.

EXAMPLE 10

*1-(3'-bromo-4'-methyl-phenyl)-piperazine*

A mixture of 133 grams of 2-bromo-4-amino-toluene, 82.5 grams of diethanol-amine and 173 cc. of hydrobromic acid of 48 percent strength is treated according to Example 9. It yields 127 grams of a crude 1-(3'-bromo-4'-methyl-phenyl)-piperazine and 138 grams of monohydrochloride melting at 220–222° C. After recrystallising twice from ethanol, the melting point amounts to 222° C.–223.5° C. The pure base boils at 135° C.–136° C. under a pressure of 0.2 mm.

EXAMPLE 11

*1-(3'-fluoro-4'-methyl-phenyl)-piperazine*

A mixture of 96 grams of 2-fluoro-4-amino-toluene, 89 grams of diethanolamine and 186 grams of hydrobromic acid of 48 percent strength yields, when treated according to Example 9, 84 grams of a crude 1-(3'-fluoro-4'-methyl-phenyl)-piperazine boiling at 115° C. under a pressure of 0.2 mm. By dissolution in ethyl acetate and neutralisation with ethanolic hydrochloric acid, there are obtained 88 grams of the monohydrochloride which, after recrystallisation from a mixture of acetone and ethanol in a ratio of 6:1, melts at 162° C. after slight sintering.

EXAMPLE 12

*1-(3'-bromo-2':4'-dimethyl-phenyl)-piperazine*

A mixture of 126.9 grams of 2-bromo-4-amino-xylene (1:3), 73.5 grams of diethanolamine and 100 cc. of hydrobromic acid of 66 percent strength is heated to 215° C., while stirring occasionally, and is maintained at this temperature for 4½ hours. The melt is worked up as described in Example 9 and from the fractions passing over above 120° C. under a pressure of 0.2 mm. 60 grams of 1-(3'-bromo-2':4'-dimethyl-phenyl)-piperazine crystallise out after some standing. The pure base boils at 127° C.–130° C. under a pressure of 0.2 mm. and melts at 54° C.–56° C. For obtaining the monohydrochloride the product is pressed off on a clay plate and the salt is obtained by dissolving in acetone and neutralising with methanolic hydrochloric acid. After recrystallisation from ethanol it decomposes at 294° C.

EXAMPLE 13

*1-ethyl-4-(3'-chloro-2':4'-dimethyl-phenyl)-piperazine*

(a) A mixture of 85 grams of 2-chloro-4-amino-xylene (1:3), 65 grams of diethanolamine and 66 cc. of hydrobromic acid of 66 percent strength is treated as described in Example 12. 69 grams of the crude crystalline 1-(3'-chloro-2':4'-dimethyl-phenyl)-piperazine are obtained melting at 120°–125° C. under a pressure of 0.25 mm. The pure base melts at 50° C.–51° C. The corresponding monohydrochloride obtained by neutralisation of the acetonic solution of the base with methanolic hydrochloric acid melts, after recrystallisation from methanol, at 280° C. (with decomposition).

(b) 34.2 grams of 1-(3'-chloro-2':4'-dimethyl-phenyl)-piperazine are heated to boiling with 40 grams of paratoluene sulphonic acid ethyl ester and 20 grams of potassium bicarbonate in 100 cc. of ethanol until no more carbon dioxide is evolved. A 1 N-sodium hydroxide solution is added; the major part of the alcohol is evaporated on the steam bath and the oil that has separated is taken up in ether. After drying and evaporation of the solvent there are obtained by distillation under reduced pressure 28.1 grams of 1-ethyl-4-(3'-chloro-2':4'-dimethyl-phenyl)-piperazine boiling at 117° C.–119° C. under a pressure of 0.3 mm. The corresponding hydrochloride obtained by neutralisation of the acetonic solution of the base with methanolic hydrochloric acid melts at 275° C.–276° C. (with decomposition, after previous sintering and turning brown of the product).

EXAMPLE 14

(a) 1-(3'-chloro-6'-nitro-4'-methyl-phenyl)-piperazine: 51 grams of 4:6-dichloro-3-nitro-toluene are dissolved in 80 cc. of toluene and, at a temperature of 70° C., they are combined with a solution of 21.3 grams of piperazine (anhydrous) in 80 cc. of toluene. The reaction mixture is stirred for one hour at 80° C. and for 3 hours at 85° C. After cooling, it is acidified by means of 2 N-hydrochloric acid. The precipitated hydrochloride is sucked off and the toluene solution is separated. The hydrochloride and the aqueous phase are combined, the whole is made alkaline by means of a sodium hydroxide solution of 40 percent strength and the free base is taken up in toluene. The oil which remains after evaporation of the toluene under reduced pressure is dissolved in acetone and is adjusted to pH 6 by means of a 10 N-hydrochloric acid in methanol. The yield amounts to 27.5 grams of 1-(3'-chloro-6'-nitro-4'-methyl-phenyl)-piperazine monohydrochloride. Melting point: 228° C.–230° C. The melting point of the monohydrobromide amounts to 216° C.–217° C.

(b) 1-(3'-chloro-6'-amino-4'-methyl-phenyl)-piperazine: 16.5 grams of 1-(3'-chloro-4'-methyl-6'-nitrophenyl)-piperazine hydrobromide are dissolved in the warmth in 200 cc. of methanol, 9 cc. of hydrazine hydrate (of 99 percent strength) are added to the solution, which is gently boiled with addition of Raney nickel until decoloration has occurred, to which effect about 30–60 minutes are required according to the quantity of nickel added. The solution is boiled vigorously for a short time, separated from the catalyst by filtration, clarified by means of charcoal, and highly concentrated under reduced pressure. By addition of a sodium hydroxide solution and taking up in ether, there are obtained on evaporation of the ether solution 8 grams of 1-(3'-chloro-4'-methyl-6'-amino-phenyl)-piperazine. The base can further be purified by sublimation under reduced pressure (bath: 130° C., pressure: 0.1 mm.) and by recrystallisation from a little toluene. The melting point of the pure compound amounts to 117.5–119.5° C.

(c) 1-(3'-chloro-4'-methyl-phenyl)-piperazine: 8 grams of the crude 1-(3'-chloro-4'-methyl-6'-amino-phenyl)-piperazine are diazotised in a solution of 6 cc. of concentrated sulphuric acid in 65 cc. of water at +5° C., while stirring, with a solution of 2.5 grams of sodium nitrite in 12.5 cc. of water. Thereupon, there are added at +5° C. 60 cc. of hypophosphorous acid of 50 percent strength, the mixture is first stirred at 20° C., then at 30° C. until no more nitrogen is evolved (about 1½ hours), made alkaline and the 1-(3'-chloro-4'-methyl-phenyl)-piperazine formed is extracted with ether. The base is purified by distillation under reduced pressure, its boiling point amounts to 131° C.–133° C. under a pressure of 0.2–0.3 mm. The yield amounts to 4.7 grams. The melting point of the monohydrochloride is 201° C. (recrystallised from a dioxane of 90 percent strength).

EXAMPLE 15

(a) 1-(3'-chloro-6'-nitro-4'-methyl-phenyl)-piperazine: A solution of 49.8 grams of 4:6-dichloro-3-nitrotoluene in 80 cc. of toluene is combined, at 60° C.–80° C., with a solution of 20.8 grams of piperazine (anhydrous) in 140 cc. of toluene. The reaction mixture is boiled for 45 minutes, while stirring, 25.6 grams of sodium carbonate (anhydrous) are added, and the mixture is boiled for another 1¾ hours until the evolution of $CO_2$ has ceased. The mixture is then made alkaline by means of an excess of 2 N-NaOH, the toluene solution is separated, dried, and the toluene is evaporated under reduced pressure. The remaining oil is dissolved in acetone and the 1-(3'-chloro-6'-nitro-4'-methyl-phenyl)-piperazine monohydrochloride is crystallised out from this solution by means of 10 N-hydrochloric acid in methanol by neutralisation to pH 6. The yield amounts to 43.2 grams. The melting point is 230° C.

(b) 1-ethyl-4-(3'-chloro-6'-nitro-4'-methyl-phenyl)-piperazine: A mixture of 28.5 grams of 4-(3'-chloro-6'-nitro-4'-methyl-phenyl)-piperazine monohydrochloride, 20 grams of sodium carbonate (anhydrous), 7.4 cc. of ethyl bromide and 80 cc. of methanol is gently boiled for about 5 hours, while stirring. The mixture is filtered by suction, the solution is highly concentrated under reduced pressure, an excess of 2 N-NaOH is added and the free base is extracted by means of methylene chloride. After evaporation of the solvent, the residue is taken up in acetone and neutralised by means of 10 N-hydrochloric acid (in methanol). After recrystallisation from absolute ethanol there are obtained 22 grams of the monohydrochloride of 1-ethyl-4-(3'-chloro-6'-nitro-4'-methyl-phenyl)-piperazine in the form of yellow needles. The product melts at 270° C.–272° C. (with decomposition).

(c) 1-ethyl-4-(3'-chloro-6'-amino-4'-methyl-phenyl)-piperazine: A mixture of 29 grams of iron powder, 35 cc. of water, 35 cc. of ethanol and 2.3 cc. of concentrated hydrochloric acid is boiled for 15 minutes under reflux, while stirring. It is then cooled to 60° C. and there are introduced, within 45 minutes, 37 grams of 1-ethyl-4-(3'-chloro-6'-nitro-4'-methyl-phenyl)-piperazine monohydrochloride in small portions so that the temperature does not exceed 70° C. The reaction mixture is boiled under reflux for another 60 minutes. Thereupon there are added 4.8 grams of anhydrous sodium carbonate, the mixture is boiled for another 15 minutes and, after addition of some charcoal, filtered in the warmth with suction. The filtration residue is washed with alcohol, the filtrate is concentrated by more than half of its volume, is made alkaline by means of 2 N-NaOH, and the base is taken up in methylene chloride. The residue remaining after drying and evaporating the solvent is purified by recrystallisation from cyclohexane or better still by distillation under reduced pressure (0.1–0.3 mm. bath: 150°–180° C.) in the sausage flask. The yield amounts to 24 grams, the melting point is 116° C. The dihydrochloride crystallises from alcohol with water of crystallisation and, after previous sintering, it decomposes from 264° C.–268° C.

(d) The conversion of the 1-ethyl-4-(3'-chloro-6'-amino-4'-methyl-phenyl)-piperazine into the 1-ethyl-4-(3'-chloro-4'-methyl-phenyl)-piperazine is effected as described in Example 14(c).

EXAMPLE 16

(a) 1-ethyl-4-(3)'-chloro-6'-nitro-4'-methyl-phenyl)-piperazine: 18 grams of 1-ethyl-piperazine and 32.5 grams of 4:6-dichloro-3-nitro-toluene in 160 cc. of toluene are boiled for 45 minutes while stirring, 17 grams of anhydrous sodium carbonate are added, and the mixture is kept boiling under reflux for another 3 hours. After cooling the reaction mixture is made alkaline by means of 2 N-NaOH, the toluene solution is separated, dried, and under reduced pressure, concentrated until a sirupy consistency is reached. Thereupon the residue is taken up in acetone, the solution is adjusted to pH 6 by means of 10 N-hydrochloric acid in methanol, whereby the 1-ethyl-4-(3'-chloro-6'-nitro-4'-methyl-phenyl)-piperazine monohydrochloride crystallises out. The yield amounts to 31–32 grams. The melting point is about 250° C.

After recrystallisation from alcohol the substance melts at 269° C.–270° C. with decomposition.

(b) The conversion of the 1-ethyl-4-(3'-chloro-6'-nitro-4'-methyl-phenyl)-piperazine monohydrochloride into the 1-ethyl-4-(3'-chloro-6'-amino-4'-methyl-phenyl)-piperazine is effected as described in Example 15(c).

(c) The conversion of the 1-ethyl-4-(3'-chloro-6'-amino-4'-methyl-phenyl)-piperazine into the 1-ethyl-4-(3'-chloro-4'-methyl-phenyl)-piperazine is effected as described in Example 14(c).

We claim:

1. A member selected from the group consisting of compounds of the general formula

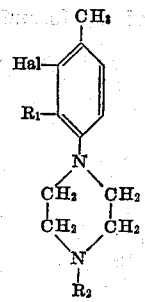

wherein Hal means a halogen atom, $R_1$ represents a member selected from the group consisting of hydrogen and methyl and $R_2$ is a member selected from the group consisting of hydrogen, and alkyl, alkenyl and hydroxyalkyl radicals having at most 4 carbon atoms, and non-toxic acid addition salts thereof.

2. A compound of the formula

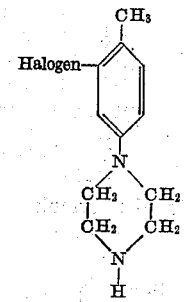

3. A compound of the formula

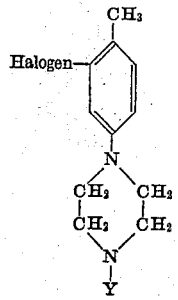

wherein Y is an aliphatic hydrocarbon radical having at most 4 carbon atoms.

4. The compound of the formula

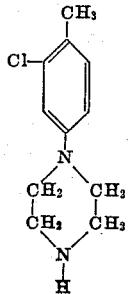

5. The compound of the formula

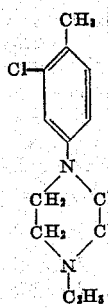

6. The compound of the formula

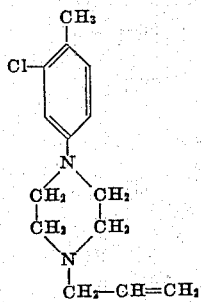

7. The compound of the formula

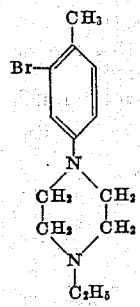

8. The compound of the formula

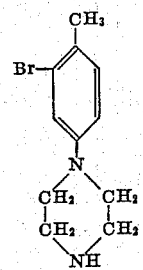

9. The process for preparing substituted phenylpiperazines of the general formula

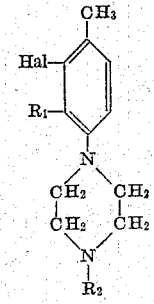

wherein Hal means a halogen atom, $R_1$ represents a member selected from the group consisting of hydrogen and methyl and $R_2$ is a member selected from the group consisting of hydrogen, and alkyl, alkenyl and hydoxyalkyl radicals having at most 4 carbon atoms, which comprises reacting para-toluidines of the formula

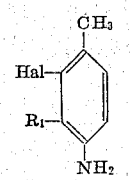

wherein Hal and $R_1$ have the meanings given above, with a member selected from the group consisting of diethanol amine, of diethanolamines substituted in the amino group by a member selected from the group consisting of hydrogen, and alkyl, alkenyl and hydroxyalkyl radicals having at most 4 carbon atoms, and of reactive derivatives of diethanolamine and substituted diethanolamines selected from the group consisting of esters of hydrohalic acid, sulfuric acid and toluene sulfonic acid.

References Cited in the file of this patent

FOREIGN PATENTS 656,588    Great Britain _____ Aug. 29, 1951

OTHER REFERENCES

Pollard et al.: J. Am. Chem. Soc. 56, 2199–2200 (1934).